(12) United States Patent
Schmidt et al.

(10) Patent No.: US 10,115,049 B2
(45) Date of Patent: Oct. 30, 2018

(54) RADIO FREQUENCY IDENTIFICATION CAPSULE

(71) Applicant: ENT. SERVICES DEVELOPMENT CORPORATION LP, Houston, TX (US)

(72) Inventors: Larry Schmidt, Rutledge, GA (US); Satwant Kaur, Mountain View, CA (US)

(73) Assignee: Ent. Services Development Corporation LP, Houston, TX (US)

( * ) Notice: Subject to any disclaimer, the term of this patent is extended or adjusted under 35 U.S.C. 154(b) by 0 days.

(21) Appl. No.: 15/306,056

(22) PCT Filed: Jun. 27, 2014

(86) PCT No.: PCT/US2014/044516
§ 371 (c)(1),
(2) Date: Oct. 21, 2016

(87) PCT Pub. No.: WO2015/199711
PCT Pub. Date: Dec. 30, 2015

(65) Prior Publication Data
US 2017/0098148 A1    Apr. 6, 2017

(51) Int. Cl.
*G06F 17/00* (2006.01)
*G06K 19/07* (2006.01)
*G06K 19/077* (2006.01)

(52) U.S. Cl.
CPC ... *G06K 19/0723* (2013.01); *G06K 19/07758* (2013.01)

(58) Field of Classification Search
CPC ........ G06F 17/00; G06K 19/00; G06K 19/06; A61B 5/00

USPC .......... 235/375, 487, 492; 600/300
See application file for complete search history.

(56) References Cited

U.S. PATENT DOCUMENTS

| | | | |
|---|---|---|---|
| 7,782,189 B2 | 8/2010 | Spoonhower et al. | |
| 8,115,618 B2 | 2/2012 | Robertson et al. | |
| 8,326,435 B2 | 12/2012 | Stevenson | |
| 8,690,068 B2 | 4/2014 | Mathews et al. | |
| 2003/0040685 A1* | 2/2003 | Lewkowicz | A61B 1/00158 600/593 |
| 2006/0210626 A1* | 9/2006 | Spaeder | A61K 9/0097 424/464 |

(Continued)

FOREIGN PATENT DOCUMENTS

KR    101013180    2/2011

OTHER PUBLICATIONS

Aubert, H.; "RFID Technology for Human Implant Devices"; Mar. 1, 2011; 18 pages. http://hal.archives-ouvertes.fr/docs/00/59/93/04/PDF/Aubert_CRAS2011.pdf.

(Continued)

*Primary Examiner* — Edwyn Labaze
(74) *Attorney, Agent, or Firm* — Sheppard Mullin Richter & Hampton LLP

(57) ABSTRACT

An example radio frequency identification capsule is disclosed herein. An example radio frequency identification capsule includes a substrate layer; a radio frequency identification layer on the substrate layer, the radio frequency identification layer including a radio frequency identification tag formed from nanoparticle ink; and a protective layer surrounding the radio frequency identification layer.

16 Claims, 12 Drawing Sheets

(56) References Cited

U.S. PATENT DOCUMENTS

| | | |
|---|---|---|
| 2006/0212096 A1 | 9/2006 | Stevenson |
| 2007/0008113 A1 | 1/2007 | Spoonhower et al. |
| 2007/0046476 A1* | 3/2007 | Hinkamp ............. A61B 5/1171 |
| | | 340/573.1 |
| 2009/0009332 A1 | 1/2009 | Nunez et al. |
| 2010/0098921 A1 | 4/2010 | Burrows |
| 2010/0323102 A1 | 12/2010 | Chopra et al. |
| 2012/0071710 A1* | 3/2012 | Gazdzinski ........ A61B 1/00016 |
| | | 600/101 |
| 2012/0111950 A1* | 5/2012 | Worrall ................ G06K 19/077 |
| | | 235/488 |
| 2013/0140806 A1* | 6/2013 | Wilkinson ........... B41M 7/0045 |
| | | 283/109 |
| 2014/0079932 A1 | 3/2014 | Aksay et al. |
| 2014/0162033 A1* | 6/2014 | Giller ................... B29C 64/106 |
| | | 428/207 |
| 2014/0309505 A1* | 10/2014 | Euliano ................ A61B 5/4833 |
| | | 600/302 |
| 2014/0367295 A1* | 12/2014 | Murray .................... B31B 1/00 |
| | | 206/459.5 |
| 2015/0011874 A1* | 1/2015 | Amoako-Tuffour ..... A61B 5/07 |
| | | 600/424 |
| 2015/0041616 A1* | 2/2015 | Gentile ................ G06Q 10/087 |
| | | 248/550 |
| 2015/0158263 A1* | 6/2015 | Maddala ................... B31F 1/07 |
| | | 427/147 |

OTHER PUBLICATIONS

PCT Search Report/Written Opinion ~ Application No. PCT/US2014/044516 dated Mar. 10, 2015 ~ 12 pages.

Watkins, T.; "Is the biochip the Mark of the Beast?"; 26 pages; obtained Oct. 18, 2016 from: http://www.av1611.org/666/biochip.html.

* cited by examiner

RADIO FREQUENCY IDENTIFICATION CAPSULE

CLAIM FOR PRIORITY

The present application is a national stage filing under 35U.S.C. § 371 of PCT application number PCT/US2014/044516, having an international filing date of Jun. 27, 2014, the disclosure of which is hereby incorporated by reference in its entirety.

BACKGROUND

Radio frequency identification is a wireless use of radiofrequency electromagnetic fields for transferring data and/or information. Radio frequency identification utilizes radio frequency identification tags including circuitry (e.g., resistor(s), capacitor(s), inductor(s), etc.) for capturing, analyzing, and/or transmitting signals.

Figure 1:
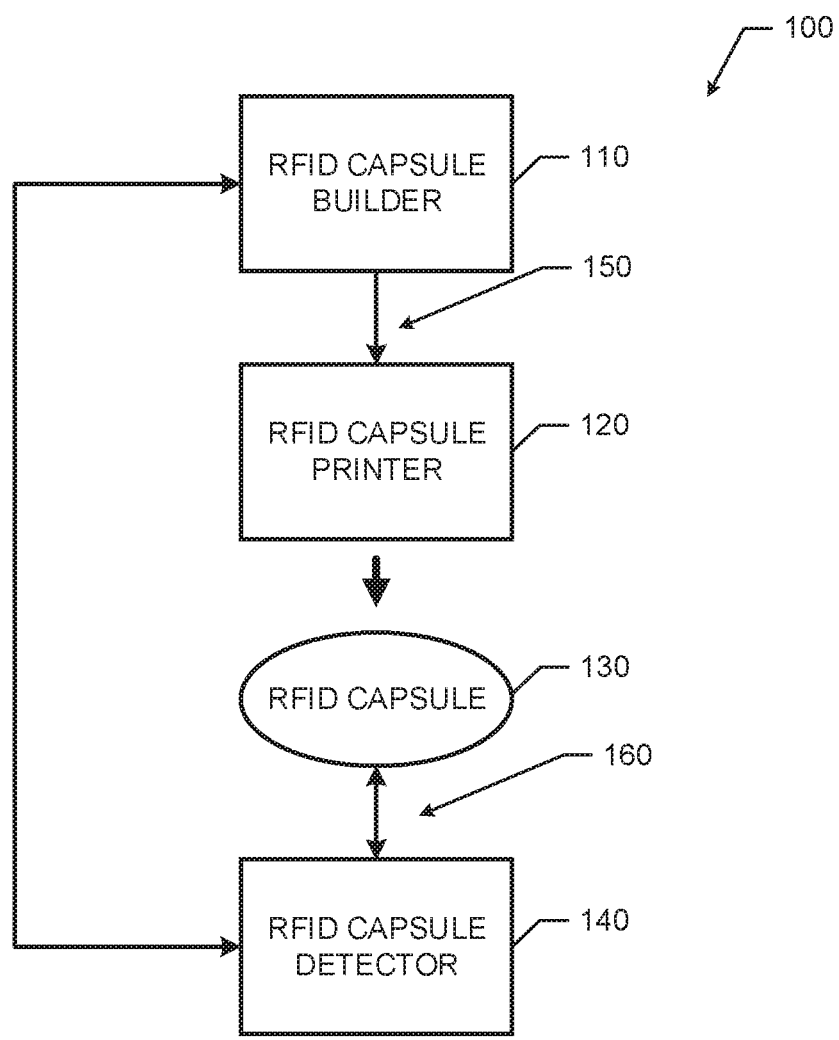
FIG. 1 is a block diagram of an example radio frequency identification (RFID) system including an example RFID capsule builder, an example RFID capsule printer, an example RFID capsule, and an RFID capsule identifier constructed in accordance with an aspect of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with at least one intermediate part located therebetween. Stating that any part is in contact with another part means that there is no intermediate part between the two parts.

DETAILED DESCRIPTION

Examples disclosed herein involve a radio frequency identification (RFID) capsule for efficient production and use in identifying a user that receives the RFID capsule. The example RFID capsule may be formed using nanoparticle materials (e.g., nanoparticle inks) such that the RFID capsule is small enough to be ingested by a user and/or surgically inserted into a user. Accordingly, the RFID capsule may be produced and/or manufactured by a three-dimensional (3D) printer.

Though RFID and RFID tags have been used in previous techniques, examples disclosed herein provide for increased reliability and efficiency in identifying a particular user corresponding to an RFID capsule. In some examples, an RFID capsule, constructed in accordance with an aspect of this disclosure, may be ingested by a user. Accordingly, the RFID capsule would be protected within a digestive system of user and substantially tamper proof. Furthermore, because the example RFID capsules disclosed herein may be ingestible (i.e., can be taken by a user's mouth), and the RFID capsules may not necessarily involve surgical insertion into a user (e.g., subcutaneous insertion). In other examples, the RFID capsules may be surgically inserted into a user. Accordingly, example systems, methods, apparatus, and articles of manufacture may be useful in many implementations from avoiding friendly fire on a battlefield to identifying a location of a pet or livestock through efficient production of an RFID capsule.

An example RFID capsule disclosed herein includes a substrate layer, an RFID layer on the substrate layer with a radio frequency identification tag formed from nanoparticle ink, and a protective layer surrounding the radio frequency identification layer. An example method disclosed herein involves printing a substrate layer of a capsule, printing an RFID tag in an RFID layer of the capsule, and printing a protective layer of the capsule over the RFID layer. An example disclosed herein involves monitoring for an RFID tag of an RFID capsule formed from nanoparticle ink, detecting the RFID tag, and determining a location of a user that received the RFID capsule.

As used herein, a three-dimensional printer (3D printer) is a machine that generates three dimensional objects (e.g., capsules) from material(s) (e.g., powder(s), ink(s), substrate(s), etc.) by printing layers of the material(s) from data and/or a digital model. As used herein, a layer may be formed from one or more applications of material(s) (e.g., by a 3D printer) and may be comprised of substantially the same materials and/or is formed to serve one or more designated purposes. As used herein, a user that receives an RFID capsule as disclosed herein may be a human (e.g., a soldier, an employee, an associate, etc.) or any other animal (e.g., a pet, a wild animal, livestock, etc.). In examples, disclosed herein, a user may receive an RFID capsule by ingesting (e.g., by mouth) the RFID capsule and/or by surgical insertion of the RFID capsule. As used herein, nanoparticle ink refers to a material comprised of nanoparticles less than ten microns in diameter.

FIG. 1 is a block diagram of an example radio frequency identification (RFID) system 100 constructed in accordance with this disclosure. The example RFID system 100 of FIG. 1 includes an RFID capsule builder 110, an RFID capsule printer 120, an RFID capsule 130, and an RFID capsule detector 140. The RFID system 100 of FIG. 1 provides for generation, manufacture, and/or use of RFID capsules 130 for identification purposes. In examples disclosed herein, a user (e.g., a human or other animal) receives (e.g., via ingestion, via surgical insertion, etc.) the RFID capsule 130, which is produced by the RFID printer 120 based on instructions from the RFID builder 110. In some such examples, the RFID capsule 130 is detected and/or monitored by the RFID capsule detector 140 while the RFID capsule 130 is within the user (e.g., in the user's digestive system). Accordingly, the example RFID capsule builder 110 of FIG. 1 provides capsule data and/or information to the RFID capsule printer 120, which is to print layers of material(s) to produce the RFID capsule 130. The RFID capsule detector 140 monitors for and/or detects the RFID capsule 130 (and/or other RFID capsule(s)).

The example RFID capsule builder 110 of FIG. 1 may be implemented by a personal computer, a tablet computer, or any other type of computing device to generate data and/or information for building the RFID capsule 130. In some examples, a user may use the RFID capsule builder 110 to generate data including information (e.g., circuit data, material(s) data, etc.) for manufacturing the RFID capsule 130. In other examples, the RFID capsule builder 110 may be configured to automatically generate such data without user interaction. The RFID capsule builder 110 provides the data to the RFID capsule printer 120 via communication link 150. The communication link 150 may be any wired and/or wireless communication link. An example implementation of the RFID capsule builder 110 is disclosed below in connection with at least FIG. 2.

The RFID capsule printer 120 of FIG. 1 may be a 3D printer capable of printing multiple materials and types of materials (e.g., applying inks and/or types of inks) to manufacture/produce a 3D object (e.g., the RFID capsule 130). The RFID capsule printer 120 may include a plurality of print heads for extrusions of inks, powders, etc. Furthermore, the RFID capsule printer 120 may include multiple mechanisms for moving the print heads in any and/or all directions and/or rotating objects produced by the RFID capsule printer 120. The RFID capsule printer 120 may include a processor and/or storage for processing and/or storing capsule data received from the RFID capsule builder 110. In some examples, the RFID capsule printer 120 may include a plurality of aerosol jet units to convert material(s), such as ink(s), powder(s), etc. to nanoparticles. Additionally or alternatively, the RFID capsule printer 120 of FIG. 1 may include a heating unit to heat the material(s) and/or a cooling unit to cool the material(s) before and/or after extrusion by the print head. Such heating and/or cooling units may be used to cure the RFID capsule 130 and/or layer(s) of the RFID capsule 130. An example implementation of the RFID capsule printer 120 is disclosed below in connection with at least FIG. 3.

The example RFID capsule 130 of FIG. 1 is produced by the RFID capsule printer 120. The RFID capsule 130 may be ingestible such that a user may swallow the RFID capsule 130 to receive the RFID capsule in the user's digestive system. The RFID capsule 130 may then remain in the digestive system (e.g., in a stomach, in intestines, etc.) for use in identifying the user. For example, the RFID capsule 130 may be configured such that after being swallowed, the RFID capsule 130 remains in a stomach of a user (e.g., due to a size of the RFID capsule 130) until the user swallows a particular substance to remove the RFID capsule 130 (e.g., to breakdown the capsule to enable passage through the rest of the digestive system). In some examples, the RFID capsule 130 may be surgically inserted into a user. In examples disclosed herein, the RFID capsule 130 stores and/or transmits information corresponding to a user (e.g., a name, an identifier, a health status, etc.). Accordingly, the RFID capsule 130 may provide information for identifying the user when the RFID capsule 130 is pinged and/or detected (e.g. by the RFID capsule detector 140).

The example RFID capsule detector 140 may be implemented by any type of computing device (e.g., a tablet computer, a smartphone, a personal digital etc.). The RFID capsule detector 140 may detect the RFID capsule 130 via wireless communication link 160 when the RFID capsule detector 140 is within a designated range (e.g., 1000 feet, 1 mile, 2 miles, etc.) of the RFID capsule 130. Such a range may depend on characteristics of the RFID capsule 130 and/or the RFID capsule detector 140. The RFID capsule detector 140 may be used to determine a location of the RFID capsule 130 and/or a location of a user that received the RFID capsule 130. In some examples, the RFID capsule detector 140 may present the location of the RFID capsule 130 on a display (e.g., via an overhead display, via a heads-up display, etc.). An example implementation of the RFID capsule detector 140 is disclosed below in connection with FIG. 6.

Figure 2:
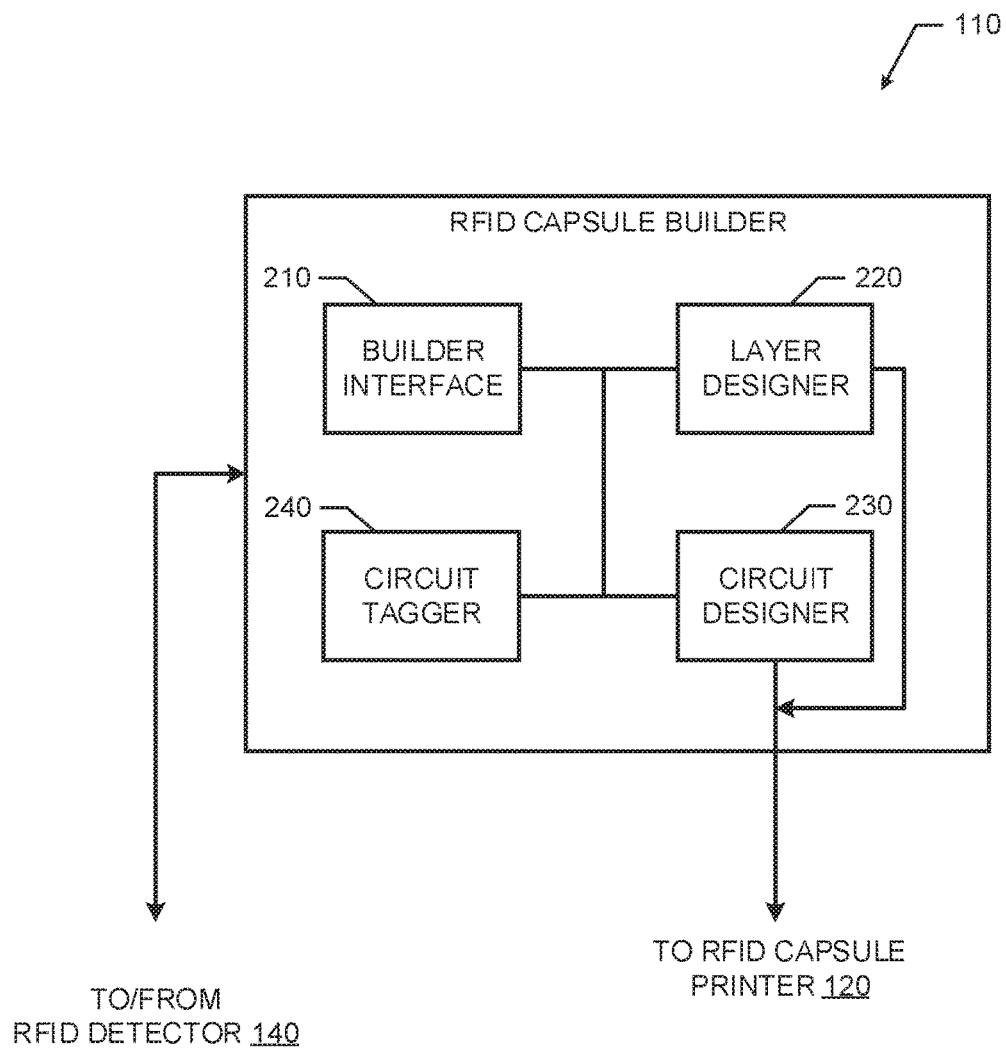
FIG. 2 is a block diagram of an example RFID capsule builder that may implement the RFID capsule builder of FIG. 1.

FIG. 2 is a block diagram of an example RFID capsule builder 110 that may be used to implement the RFID capsule builder 110 of FIG. 1. The RFID capsule builder 110 in the illustrated example of FIG. 2 includes a builder interface 210, a layer designer 220, a circuit designer 230, and a circuit tagger 240. The example RFID capsule builder 110 of FIG. 2 may be implemented by any type of computing device (e.g., a personal computer, a tablet computer, etc.). The RFID capsule builder 110 of FIG. 2 provides circuit data, layer data, and/or print instructions to the RFID capsule printer 120 and/or the RFID capsule detector 140 of FIG. 1.

The builder interface 210 of FIG. 2 facilitates communication with and/or access to a user for building RFID capsule data via the RFID capsule builder 110. The example builder interface 210 of FIG. 2 may be implemented by any type of input device(s) (e.g., a mouse, keyboard, trackball, touchscreen, etc.) and/or output device(s) (e.g., a display monitor, speaker, etc.). In some examples, the builder interface 120 may facilitate communication with other device(s) (e.g., the RFID detector 140) and/or network(s).

The example layer designer 220 of FIG. 2 generates and/or configures layer data for creating the RFID capsule 130. In examples disclosed herein, the layer designer 220 may receive instructions from a user via the builder interface 210 to create layer data for the RFID capsule 130. Such layer data may include information corresponding to material(s) for each layer, number of layer(s), contents of layer(s), thickness of layer(s), heating/cooling information for layer(s), etc. Accordingly, the layer designer 220 generates and provides data corresponding to structural characteristics of the RFID capsule 130 to the RFID capsule printer 120 for producing the RFID capsule 130.

The example circuit designer 230 of FIG. 2 generates and/or configures circuit data for creating an RFID circuit to implement an RFID tag in the RFID capsule 130. The example circuit designer 230 may be any type of circuit design application that may be accessed by the user via the builder interface 210 to build circuits for an RFID tag of the RFID capsule 130. The example circuit designer 230 may generate circuit data from circuits built by a user and/or the circuit designer 230. In some examples, the circuit data may include material data corresponding to which materials are to be used to produce particular components of the circuits. For example, the circuit designer 230 may be a modeling tool for creating circuit files and/or geometric structure files (e.g. a stereolithography (.STL) file) from computer-aided design (CAD) drawings. Furthermore, the circuit designer 230 may generate commands (e.g., G-codes) to be included in print instructions sent from the RFID capsule builder 110 to the RFID capsule printer 120. The example circuit data from the circuit designer 230 may be combined with layer data from the layer designer 220 to create print instructions for the RFID capsule printer 120 to produce an RFID tag of the RFID capsule 130.

The example circuit tagger 240 of FIG. 2 tags RFID circuits and/or RFID information generated by the circuit designer 230 with information corresponding to a user. The circuit tagger 240 may receive and store user characteristics and/or information (e.g., a name, an identifier (e.g., rank, affiliation, etc.), a status, etc.) via the builder interface 210. The circuit tagger 240 may store information and/or data from the circuit designer 230 that corresponds to a generated circuit (e.g., a circuit identifier, a circuit tag, a circuit configuration, etc.). Accordingly, when the RFID capsule 130 is identified based on the circuit of the RFID tag in the RFID capsule, user information corresponding to the RFID capsule may be cross-referenced via the circuit tagger 240. In some examples, the circuit tagger 240 may provide corresponding tag information to other device(s) (e.g., the RFID capsule detector 140 of FIG. 1) and/or network(s).

While an example manner of implementing the RFID capsule builder 110 of FIG. 1 is illustrated in FIG. 2, at least one of the elements, processes and/or devices illustrated in FIG. 2 may be combined, divided, re-arranged, omitted, eliminated and/or implemented in any other way. Further, an example apparatus including the builder interface 210, the layer designer 220, the circuit designer 230, the circuit tagger 240, and/or, more generally, the example RFID capsule builder 110 of FIG. 2 may be implemented by hardware and/or any combination of hardware, software and/or firmware. Thus, for example, any of the builder interface 210, the layer designer 220, the circuit designer 230, the circuit tagger 240, and/or, more generally, the example RFID capsule builder may be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of builder interface 210, the layer designer 220, the circuit designer 230, and/or the circuit tagger 240 is/are hereby expressly defined to include a tangible computer readable storage device or storage disk such as a memory, a digital versatile disk (DVD), a compact disk (CD), a Blu-ray disk, etc. storing the software and/or firmware. Further still, the example RFID capsule builder 110 of FIG. 2 may include at least one element, process, and/or device in addition to, or instead of, those illustrated in FIG. 2, and/or may include more than one of any or all of the illustrated elements, processes and devices.

Figure 3:
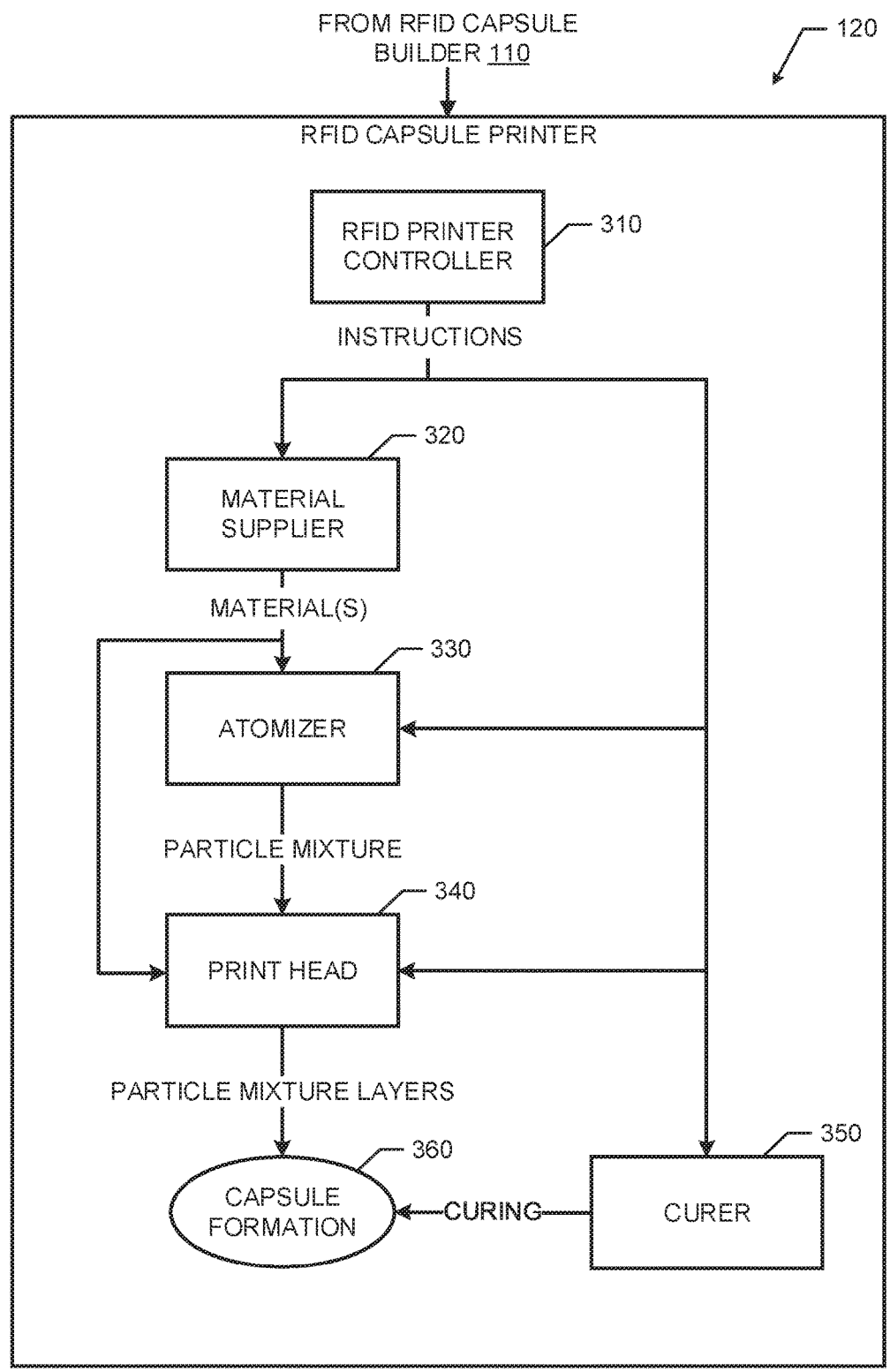
FIG. 3 is a block diagram of an example RFID capsule printer that may implement the RFID capsule printer of FIG. 1.

FIG. 3 is a block diagram of an example RFID capsule printer 120 that may be used to implement the RFID capsule printer 120 of FIG. 1. The example RFID capsule printer 120 of FIG. 3 includes an RFID printer controller 310, a material supplier 320, an atomizer 330, a print head 340, and a curer 350. An example capsule formation 360, which may become the RFID capsule 130 of FIG. 1 when completely formed by the RFID capsule printer 120, represents an example RFID capsule 130 that is formed and/or printed by the RFID capsule printer 120. The example capsule formation 360 may be located in a printing area or printing bay of the RFID capsule printer 120.

In the illustrated example of FIG. 3, the RFID printer controller 310 controls the material supplier 320, the atomizer 330, the print head 340, and/or the curer 350 to produce the RFID capsule 130. The RFID printer controller 310 may be implemented by a processor (e.g., the processor 1212) and/or a processor platform (e.g., the processor platform 1200). The example RFID printer controller 310 may receive print instructions (e.g., circuit data and/or layer data) from the RFID capsule builder 110 of FIGS. 1 and/or 2. The print instructions include data that is analyzed and processed by the printer controller 310 to control the material supplier 320, the atomizer 330, the print head 340, and/or the curer 350 to form the RFID capsule 130. For example, material data in the print instructions may be sent to the material supplier 320, layer data and/or atomizer data in the print instructions may be sent to the atomizer 330, layer data and/or material data the print instructions may be sent to the print head 340, and layer data and/or heating/cooling data in the print instructions for curing the capsule may be sent to the curer 350. Accordingly, the RFID printer controller 310 receives, parses, analyzes, and/or provides print instructions for printing layers of the RFID capsule 130 to produce the RFID capsule 130.

The example material supplier 320 of FIG. 3 provides material(s) (e.g., ink(s), powder(s), etc.) to an atomizer 330 and/or the print head 340 based on instructions from the RFID printer controller 310. The material supplier 320 may include a plurality of tanks for storing material(s) for producing the RFID capsule 130. For example, the material supplier 320 may include separate ink tanks to store materials corresponding to components that are to be included in an RFID tag and/or layer(s) that are to be included in the RFID capsule 130. Such ink tanks may store inks such as polycarbonate ink, silver-based ink, strontium-ferrite based ink, gold based ink, ion gel based ink, nanocarbon based ink, etc. The material supplier 320 may supply the material(s) (e.g., via valves, lines, or other mechanisms for transferring the material(s)) to the atomizer 330 and/or directly to the print head 340.

The example atomizer 330 of FIG. 3 converts material(s) (e.g., ink(s)) from the material supplier 320 to nanoparticles. The atomizer 330 may heat and/or atomize the material(s) from the material supplier 320 into material nanoparticles (e.g., ink droplets having a diameter of 1-10 microns) based on instructions from the RFID printer controller 310. The atomizer 330 may use aerosol jet(s) to mix the material particles with a carrier gas stream (e.g., dry nitrogen or other vapor). The example atomizer 330 may provide the particle mixture (i.e., the material particles mixed with the carrier gas stream) to the print head 340 for extrusion. Accordingly, the example atomizer 330 may convert material(s) into nanoparticle ink(s) for extrusion by the print head 340.

The example print head 340 of FIG. 3 applies (i.e., extrudes) the material(s) and/or the particle mixture (e.g., nanoparticle ink(s)) to the capsule formation 360 and/or applies the material(s) and/or particle mixture to begin creating the capsule formation 360. The print head 340 may extrude the material(s) and/or particle mixture at a relatively high velocity to create each layer of the RFID capsule 130 by bonding the material(s) and/or particle mixture directly to another layer of the RFID capsule 130. In some examples, to begin forming the RFID capsule 130, the print head 340 may form a substrate layer for the RFID capsule 130 from polycarbonate material(s) and/or a polycarbonate particle mixture (e.g., a polycarbonate ink). In some examples, the curer 350 of FIG. 3 cure (e.g., by heating or cooling) the capsule formation 360 to finalize and/or form the RFID capsule 130. In examples disclosed herein, the curer 350 may cure the capsule formation 360 before, during, and/or after the print head forms each layer of the RFID capsule 130.

While an example manner of implementing the RFID capsule printer 120 of FIG. 1 is illustrated in FIG. 3, at least one of the elements, processes and/or devices illustrated in FIG. 3 may be combined, divided, re-arranged, omitted, eliminated and/or implemented in any other way. The example RFID printer controller 310 of the RFID capsule printer 120 and/or processors corresponding to each of the material supplier 320, the atomizer 330, the print head 340, and/or the curer 350 may be implemented by at least one of an analog or digital circuit, a logic circuit, a programmable processor, an application specific integrated circuit (ASIC), a programmable logic device (PLD) and/or a field programmable logic device (FPLD). Furthermore, the example RFID capsule printer 120 of FIG. 3 may include at least one element, process, and/or device in addition to, or instead of, those illustrated in FIG. 3, and/or may include more than one of any or all of the illustrated elements, processes and devices.

Figure 4A:
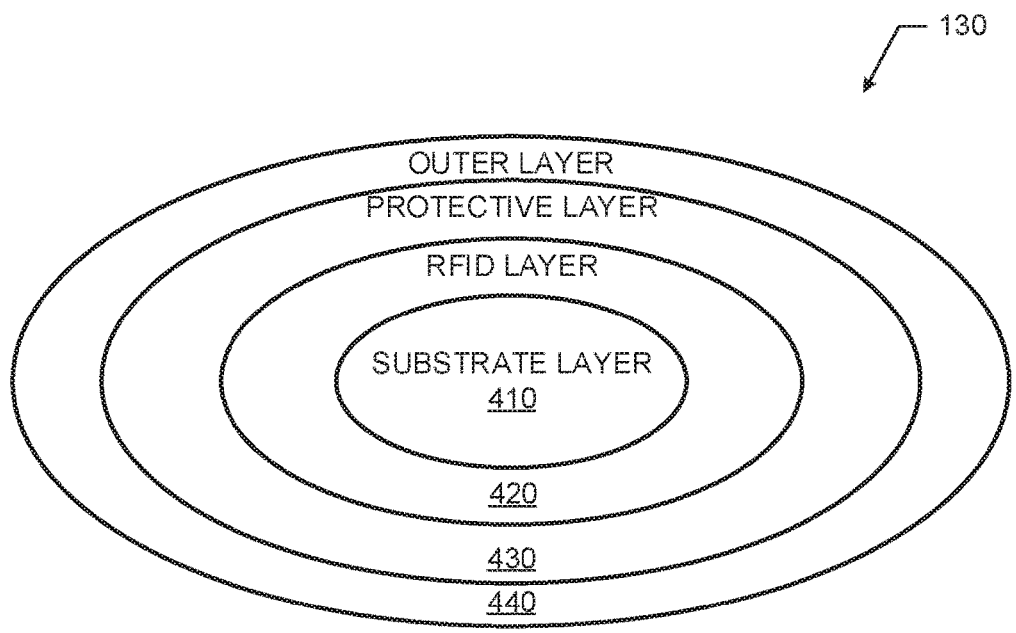
FIGS. 4A-4B illustrate a cross section of example RFID capsule(s) that may implement the RFID capsule of FIG. 1 in accordance with an aspect of this disclosure.
Figure 4B:
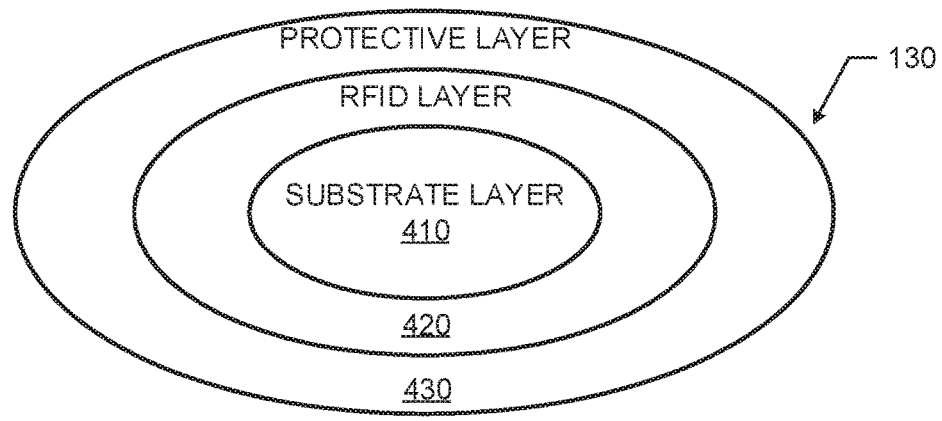

Accordingly, the RFID capsule printer 120 may produce the example RFID capsule 130 of FIG. 1. FIGS. 4A and/or 4B illustrate a cross section of example RFID capsule(s) 130 that may have been manufactured/produced by the RFID capsule printer 120 and may be used to implement the RFID capsule 130 of FIG. 1 to show layers of the RFID capsule 130. The example RFID capsule(s) 130 of FIGS. 4A and 4B include a substrate layer 410 as a base layer, an RFID layer 420 to include an RFID tag, and a protective layer 430 to preserve the RFID tag. The example RFID capsule of FIG. 4A also includes an outer layer 440.

The example substrate layer 410 of FIGS. 4A and/or 4B is an inner supporting substrate for the RFID capsule 130. The substrate layer 410 may be formed from a polycarbonate ink. For example, a print head 340 of the RFID capsule printer 120 may extrude polycarbonate ink heated at a high temperature (e.g., above 300° Celsius) to form the substrate layer 410 and cure the substrate layer 410 by cooling. In such an example, the substrate layer 410 is a relatively strong and stable innermost layer of the RFID capsule 130. The substrate layer 410 serves as a base layer upon which the RFID layer 420 can be printed/applied. Accordingly, the RFID layer 420 is in contact with the substrate layer 410. The example RFID layer 420 at least partially covers the substrate layer 410.

The example RFID layer 420 includes an example RFID tag to identify the RFID capsule 130. An example RFID tag, as used herein, is an electronic circuit including at least one of a resistor, an inductor, and a capacitor (see FIG. 5) for wireless communication. The example RFID tag of the RFID layer 420 wirelessly communicates data (e.g., identification information such as a name, an identifier, a status, etc.) to an RFID receiver and/or an RFID detector (e.g. the RFID capsule detector 140 of FIG. 1). Accordingly, the RFID layer 420 includes electronic components for communication via RFID. An example RFID tag in the RFID layer 420 is formed from nanoparticle ink. For example, nanoparticle ink patterns may be used to form electronic components of the RFID tag in the RFID layer 420. The example RFID layer 420 may be applied between the substrate layer 410 and the protective layer 430 such that the substrate layer 410 and the protective layer 430 are not in contact. In some examples, the RFID layer 420 may include substrate material (e.g., formed from polycarbonate ink) between components of the RFID tag.

The protective layer 430 of FIGS. 4A and/or 4B surrounds the RFID layer 420 to prevent the RFID layer 420 from being destroyed (e.g., by being broken down by stomach acid or other chemicals). In some examples, the protective layer 430 is formed from polycarbonate ink (similarly to the substrate layer 410), though other material(s) may be used. The protective layer 430 may completely surround and/or coat the RFID layer 420 and/or the substrate layer 410 to prevent the RFID layer 420 from contacting any other materials or substances (e.g., air, liquids, stomach acid, etc.) other than the substrate layer 410 or the protective layer 430. The protective layer 430 may be formed from a material that causes the RFID capsule 130 to remain in the digestive system of a user that ingested the RFID capsule 130 for a period of time. In some examples, a length of the period of time may be based on a thickness of the protective layer 430. For example, the thicker the protective layer 430 of the RFID capsule 130, the longer it may take the user's digestive system to breakdown and/or pass the RFID capsule 130 through the user's digestive system. In some examples, the RFID capsule 130 may be monitored such that a user that ingested the RFID capsule 130 may be alerted when the RFID capsule 130 has passed through the user's digestive system (e.g., unintentionally or unknowingly). For example, the user may carry an RFID capsule detector 140, and when a threshold distance (e.g., 1 meter, 3 meters, etc.) is measured between the RFID capsule 130 and the RFID capsule detector 140, an alert may be sent to the user via the RFID capsule detector 140. In such examples, the alert may indicate that the RFID capsule 130 ingested by the user has been expelled from the user.

In some examples, the protective layer 430 of FIGS. 4A and/or 4B may be formed from a material that will dissolve and/or breakdown when in contact with a particular type of substance or material. For example, if the RFID capsule 130 has been ingested and is located within a user's stomach, the user may ingest a substance that would break down and/or dissolve the protective layer 430, the RFID layer 420, and/or the substrate layer 410 to remove the RFID capsule 130 from the user. Accordingly, in such an example, the RFID capsule 130 may pass through the remainder of the digestive system of a user that ingested the RFID capsule 130.

The example RFID capsule 130 of FIG. 4A includes an outer layer 440. The example outer layer 440 may be comprised of materials that facilitate ingestion for a user. For example, the outer layer 440 may be a smooth coating for ease of swallowing and/or a flavored coating for a more desirable taste. In some examples, the outer layer 440 may be a dissolvable layer that dissolves after being ingested by a user (e.g. due to contact with stomach acid, bile, etc.). Accordingly, the RFID capsule 130 of FIG. 4A may represent an RFID capsule 130 before being ingested by a user, and the RFID capsule 130 of FIG. 4B may represent the RFID capsule 130 after being ingested by the user. In some examples, the outer layer 440 may protect the RFID capsule 130 for surgical insertion. For example, the outer layer 440 may be formed from a glass-like ink, ink(s) that form a glass-like material, or other material to protect the RFID capsule 130 from dissolving in a user's body after surgical insertion.

Figure 5:
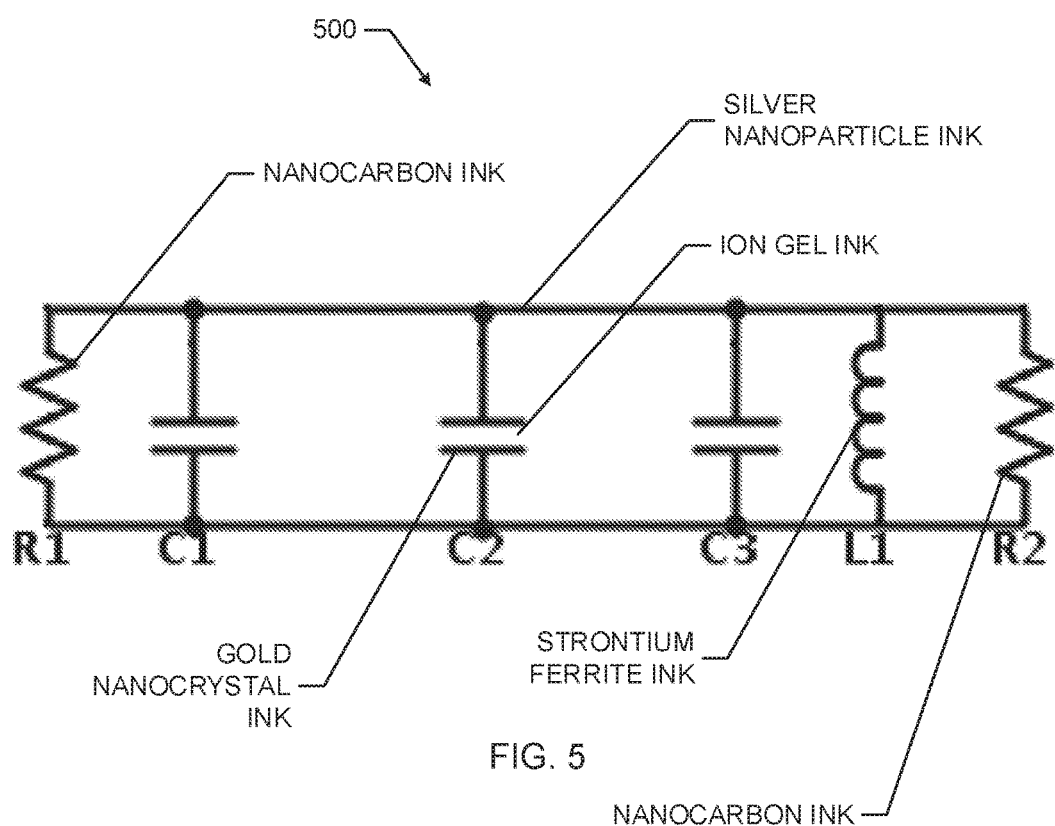
FIG. 5 is an example circuit that may implement an example RFID tag in the RFID capsule(s) of FIGS. 1, 3A, and/or 3B.

FIG. 5 is a schematic diagram of an example RFID circuit 500 to implement an RFID tag that may be included in the RFID layer 420 of the RFID capsule 130 of FIGS. 1, 4A, and/or 4B. The example RFID circuit 500 includes two resistors R1, R2, three capacitors C1, C2, C3 and an inductor L1 connected in parallel with one another. The value(s) and/or configuration of the components R1, R2, C1, C2, C3, L1 may be adjusted to transmit and/or reflect identification information. The example RFID capsule printer 120 may adjust the value(s) of the components R1, R2, C1, C2, C3, L1 based on an amount of material and/or particle mixture used to create each of the corresponding components in the RFID layer 420 of the RFID capsule 130. For example, if R1 is formed from nanocarbon ink, an amount of nanocarbon ink used to form R1 affects the resistance of R1.

FIG. 5 denotes example material(s) used to form the components of the example RFID circuit 500 to create an RFID tag in the RFID layer 420. In the illustrated example of FIG. 5, the resistors R1, R2 are formed from nanocarbon ink, the capacitors C1, C2, C3 are formed from ion gel ink dielectrics and gold nanocrystal ink electrodes, the inductor L1 is formed from a strontium ferrite ink, and connectors between the components R1, R2, C1, C2, C3, and L1 are formed from a silver nanoparticle ink. Example RFID circuits other than the RFID circuit 500 of FIG. 5 may be implemented in the RFID layer 420 of the RFID capsule 130. The example RFID capsule builder 110 may generate circuit data and/or layer data representative of the RFID circuit 500 of FIG. 5 for printing an RFID capsule 130 to include an RFID tag corresponding to the RFID circuit 500.

Figure 6:
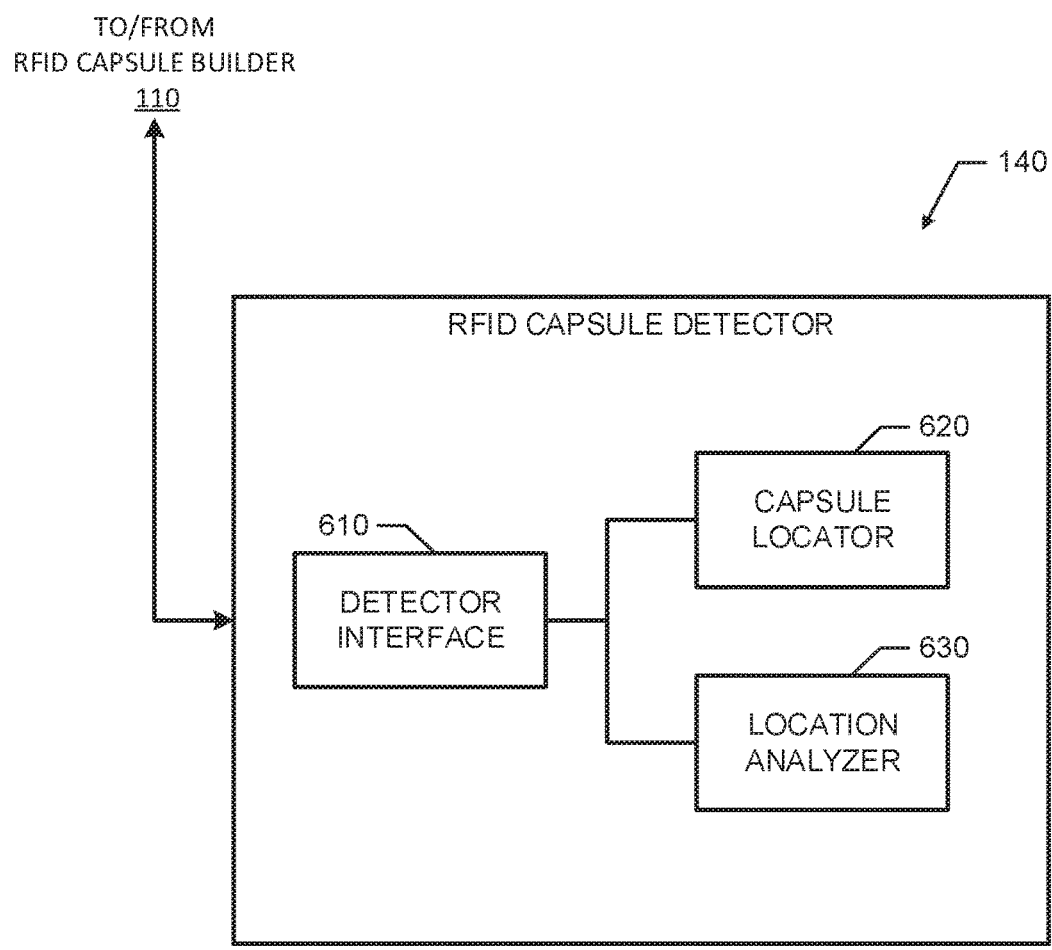
FIG. 6 is an example RFID capsule detector that may implement the RFID capsule detector of FIG. 1.

FIG. 6 is a block diagram of an example RFID capsule detector 140 that may be used to implement the RFID capsule detector 140 of FIG. 1. The example RFID capsule detector 140 includes a detector interface 610, a capsule locator 620, and a location analyzer 630. The RFID capsule detector 140 may be used to detect the RFID capsule 130 of FIGS. 1, 4A, and/or 4B by detecting signals from an RFID tag of the RFID capsule 130. The RFID detector 140 may locate the RFID capsule 130 and/or present a location of the RFID capsule 130 to a user of the RFID capsule detector 140.

The example detector interface 610 of FIG. 6 facilitates communication with and/or access to a user to detect the RFID capsule 130 via the RFID capsule detector 140. The example detector interface 610 of FIG. 2 may be implemented by any type of input device(s) (e.g., a mouse, keyboard, trackball, touchscreen, etc.) and/or output device(s) (e.g., a display monitor, touchscreen, speaker, etc.). In some examples, the detector interface 610 may facilitate communication with other device(s) (e.g., the RFID capsule builder 110) and/or network(s). The example detector interface 610 may display location information of the RFID capsule 130 based on information received form the capsule locator 620 and/or the location analyzer 630.

The example capsule locator 620 may be a receiver and/or transceiver capable of detecting signals from the RFID capsule 130. For example, the capsule locator 620 may transmit RFID signals that are received and retransmitted by the RFID capsule 130 (e.g., reflected) with identification information corresponding to the RFID capsule 130. In other words, the capsule locator 620 may monitor for the RFID capsule 130 (and/or other RFID capsules or RFID tags) up to a designated range (e.g., 2000 feet, 2 miles, etc.). When the RFID capsule 130 is within range of the capsule locator 620, the example capsule locator 620 may detect the RFID capsule 130 and send a notification and/or corresponding information (e.g., a name, an identifier, a status, etc.) from the RFID capsule 130 to the detector interface 610. Accordingly, the capsule locator 620 may receive identification information corresponding to the RFID capsule 130 for display via the detector interface 610 to indicate to a user of the RFID capsule detector 140 that the RFID capsule 130 and/or another user that received the RFID capsule 130 is within range and/or at a designated location.

In some examples, the capsule locator 620 of FIG. 6 may directionally monitor for the RFID capsule 130 and/or determine a direction relative to the RFID capsule detector 140 from which a signal corresponding to the RFID capsule 130 was received. For example, the capsule locator 620 may scan for RFID capsules 620 in a designated direction relative to the RFID capsule detector 140 (e.g., within a range of 90° (e.g., between 80° and 100°) from the RFID capsule detector 140, within a range of 0° (e.g., between 355° and 5°, etc.). When the RFID capsule detector 140 detects the RFID capsule 130 within a designated range, the RFID capsule detector 140 may indicate the designated direction to the detector interface 610 and/or the location analyzer 630.

In some examples, the capsule locator 620 of FIG. 6 may measure signal strengths of signals received from the detected RFID capsule 130. In such examples, the capsule locator 620 may forward the measured signal strengths to location analyzer 630 and/or the detector interface 610. The location analyzer 630 may use the signal strengths to determine a distance of the RFID capsule 130 from the RFID capsule detector 140. For example, stronger signal strengths may indicate the RFID capsule 130 is relatively near the RFID capsule detector 140 while weaker signal strengths may indicate that the RFID capsule 130 is relatively far from the RFID capsule detector 140.

The example location analyzer 630 of FIG. 6 calculates and/or determines a location of the detected RFID capsule 130. In some examples, the location analyzer 630 provides the determined location information to the detector interface 610. In some examples, the location analyzer 630 may use the above direction measurements and/or signal strength measurements to determine the location of the RFID capsule 130. For example, if the RFID capsule 130 is detected at 45° with a signal strength indicating the RFID capsule 130 is 100 ft. away, the location analyzer 630 may calculate that particular location (e.g., using polar coordinates and/or rectangular coordinates) relative to the RFID capsule detector 140. The example location analyzer 630 may send coordinates corresponding to the determined location to the detector interface 610 to display to a user of the RFID capsule detector 140.

In some examples, the location analyzer 630 may determine a location of the RFID capsule 130 using information from other devices, such as the RFID capsule builder 110 and/or a global positioning system (GPS) device. For example, when the capsule locator 620 receives identification information from the RFID capsule 130, the RFID capsule detector 140 (e.g., via the detector interface 610) may send the identification information to the RFID capsule builder 110 and/or some other device that includes a database that cross-references the identification information to characteristics of the user. Such characteristics may include location information such as a GPS location data (and/or GPS device information) that may provide a current geographic location of the user. Such geographic information may then be retrieved by the RFID capsule detector 140 to be analyzed by the location analyzer 630. The example location analyzer 630 may analyze the geographic location information relative to the geographic location of the RFID capsule detector 140 (e.g., based on GPS data and/or some other geolocation system data) to determine a location of the RFID capsule relative to the RFID capsule detector 140. Accordingly, the RFID capsule detector 140 and/or the location analyzer 630 may use information from other devices and/or other systems to determine and/or verify the location of the RFID capsule 130.

In some examples, the RFID capsule detector 140 may retrieve user characteristic data corresponding to identification information received by the capsule locator 620 from the RFID capsule 130. For example, the RFID capsule detector 140 may communicate with a health monitoring system (e.g., heart rate information is transmitted from a heart monitor worn by a user that received the RFID capsule 130) via the detector interface 610. Such a health monitoring system may include a database of identification information cross referenced with current health statuses of corresponding users that received the example RFID capsule(s) 130. Accordingly, when identification information is received from the RFID capsule 130, the RFID capsule detector 140 may retrieve and/or display health information corresponding to a user that received the RFID capsule 130 via the detector interface 610. In such an example, a user of the RFID capsule detector 140 may determine that a user that received the RFID capsule 130 is or is not healthy.

While an example manner of implementing the RFID capsule detector 140 of FIG. 1 is illustrated in FIG. 6, at least one of the elements, processes and/or devices illustrated in FIG. 6 may be combined, divided, re-arranged, omitted, eliminated and/or implemented in any other way. Further, an example apparatus including the detector interface 610, the capsule locator 620, the location analyzer 630 and/or, more generally, the example RFID capsule detector 140 of FIG. 6 may be implemented by hardware, software, firmware and/or any combination of hardware, software and/or firmware. Thus, for example, any of the detector interface 610, the capsule locator 620, the location analyzer 630 and/or, more generally, the example RFID capsule detector 140 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the detector interface 610, the capsule locator 620, and/or the location analyzer 630 is/are hereby expressly defined to include a tangible computer readable storage device or storage disk such as a memory, a digital versatile disk (DVD), a compact disk (CD), a Blu-ray disk, etc. storing the software and/or firmware. Further still, the example RFID capsule detector 140 of FIG. 6 may include at least one element, process, and/or device in addition to, or instead of, those illustrated in FIG. 6, and/or may include more than one of any or all of the illustrated elements, processes and devices.

Figure 7:
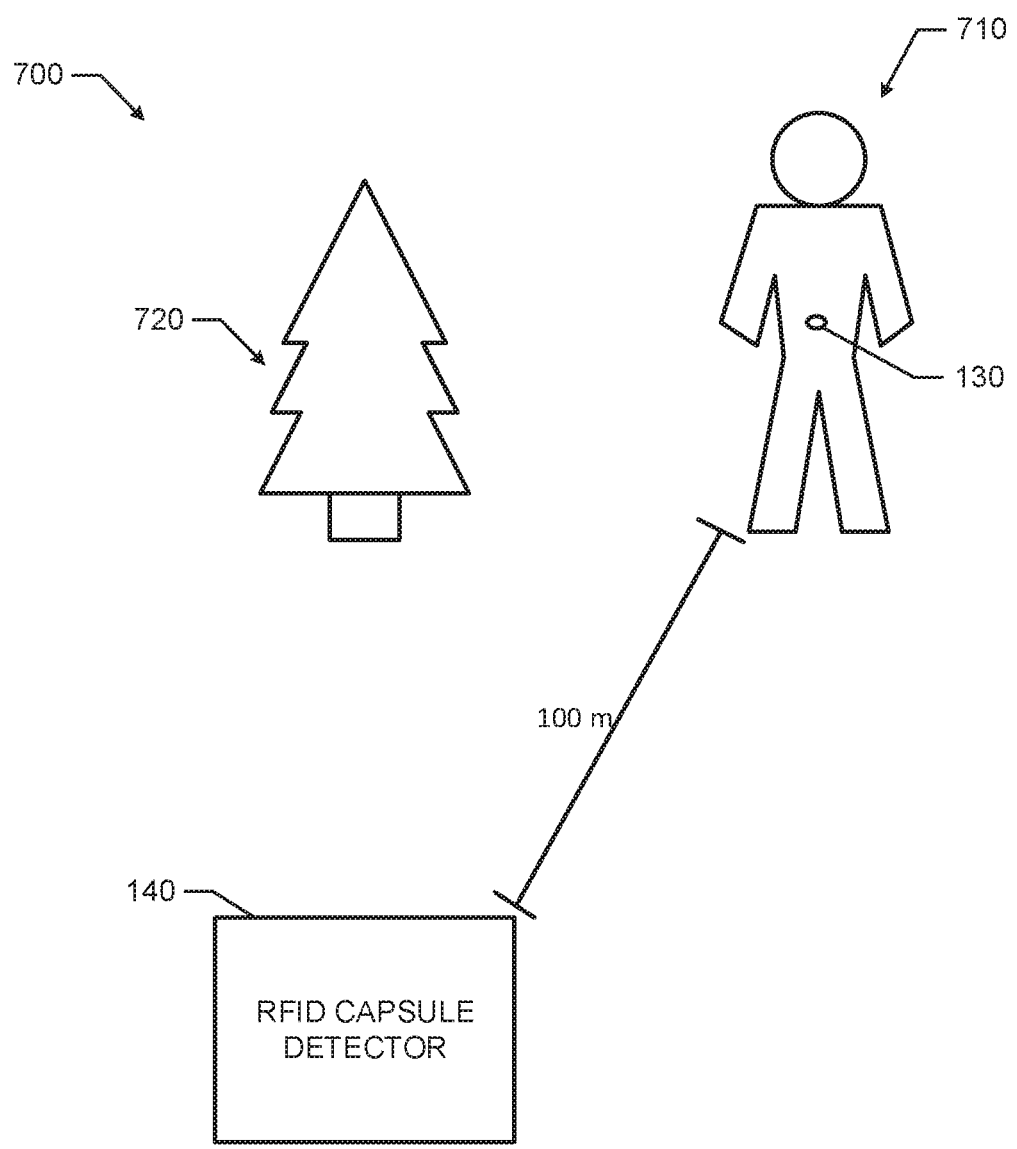
FIG. 7 illustrates an example environment of use in which the RFID system of FIG. 1 may be implemented in accordance with an aspect of this disclosure.

FIG. 7 illustrates an example environment of use 700 in which the RFID system 100 of FIG. 1 may be implemented in accordance with an aspect of this disclosure. In FIG. 7, a user 710 received an RFID capsule 130 and is located near a tree 720. In the illustrated example of FIG. 7, the user 720 is located approximately 100 meters from an example RFID capsule detector 140, which may be implemented by the RFID capsule detector 140 of FIGS. 1 and/or 6. In FIG. 7, the user 710 is located within range of the RFID capsule detector 140. Accordingly, the RFID capsule detector 140 may detect the RFID capsule 130 and/or determine a location of the user 710 in accordance with the teachings of this disclosure.

Figure 8A:
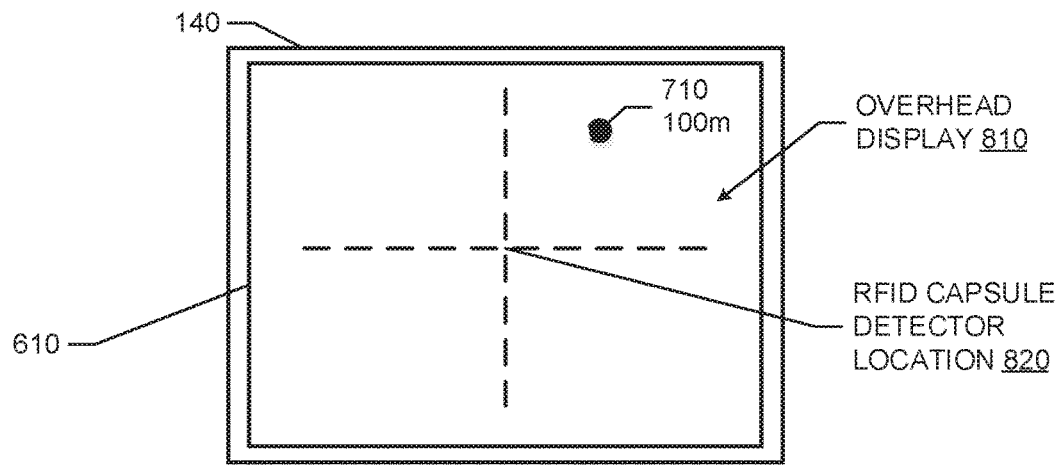
FIG. 8A illustrates an example display that may be implemented by the RFID capsule detector of FIGS. 1, 5, and/or 6.

The example environment of use 700 of FIG. 7 will now be referred to with reference to FIGS. 8A and/or 8B to illustrate example display system(s) implemented by a detector interface 610 of the RFID capsule 140 of FIG. 7. In the illustrated example of FIG. 8A, an example overhead display 810 of the RFID capsule detector 140 of FIG. 7 is illustrated. The overhead display 810 may be any type of display device (e.g., a liquid crystal display (LCD), a light emitting diode (LED) display, etc.). The example overhead display 810 designates a location 820 of the RFID capsule detector 140 in a center of axes of the overhead display 810. As mentioned above, in FIG. 7, the RFID capsule detector 140 determined a location of the user 710. As illustrated in FIG. 8A, the overhead display 810 illustrates the location of the user 710 relative to the location of the RFID capsule detector 140, identification information of the user 710 (e.g., the reference number '710') and distance information of the user 710.

Figure 8B:
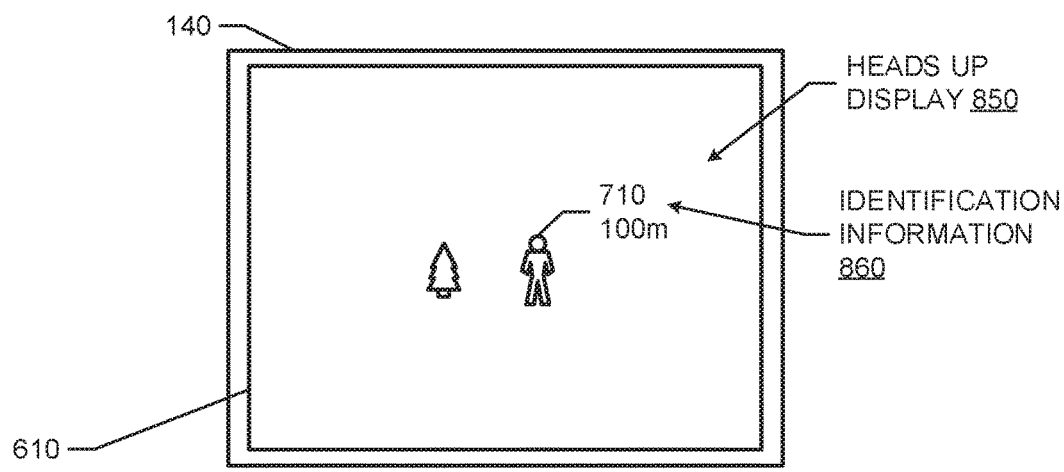
FIG. 8B illustrates another example display that may be implemented by the RFID capsule detector of FIGS. 1, 6, and/or 7.

In the illustrated example of FIG. 8B, an example heads up display 850 of the RFID capsule detector 140 of FIG. 7 is illustrated. The example heads up display 850 may be implemented by any type of heads up display devices (e.g., infrared goggles, Google Glass™, etc.). For example, the heads up display 850 may be implemented via a soldiers night vision goggles and/or an infrared scope on a gun of the soldier. Accordingly, when the RFID capsule detector 140 detects the RFID capsule 130 in the user 710 of FIG. 7, identification information 860 may be displayed (e.g., as a pop-up) with the image of the user 710. As illustrated in FIG. 8B, the heads up display 850 shows the user 710 standing near the tree 720 of FIG. 7. When the user 710 appears on the heads up display 850 and the RFID capsule 130 received by the user 710 is detected by the RFID capsule detector 140 in accordance with the teachings of this disclosure, the identification information 860 may be processed and/or calculated to be included next to and/or near the user 710 on the heads-up display 850. In other words, the identification information 860 may pop-up when a user comes into view on the heads up display 850. In some examples, identification of an object (e.g., the user 710) on a heads up display may cause the RFID capsule detector 140 to scan and/or monitor a corresponding area (e.g., the area near or around the tree 720) of the heads up display 850 to determine whether the object is a known object (e.g., a user that received an RFID capsule) or is an unknown or unrecognized object. Accordingly, real-time or substantially real-time images of users on a heads up display may be adapted by the RFID capsule detector 140 to include identification information as disclosed herein. Object detection and/or image analysis may be implemented by the RFID capsule detector 140 using any suitable techniques.

Figure 9:
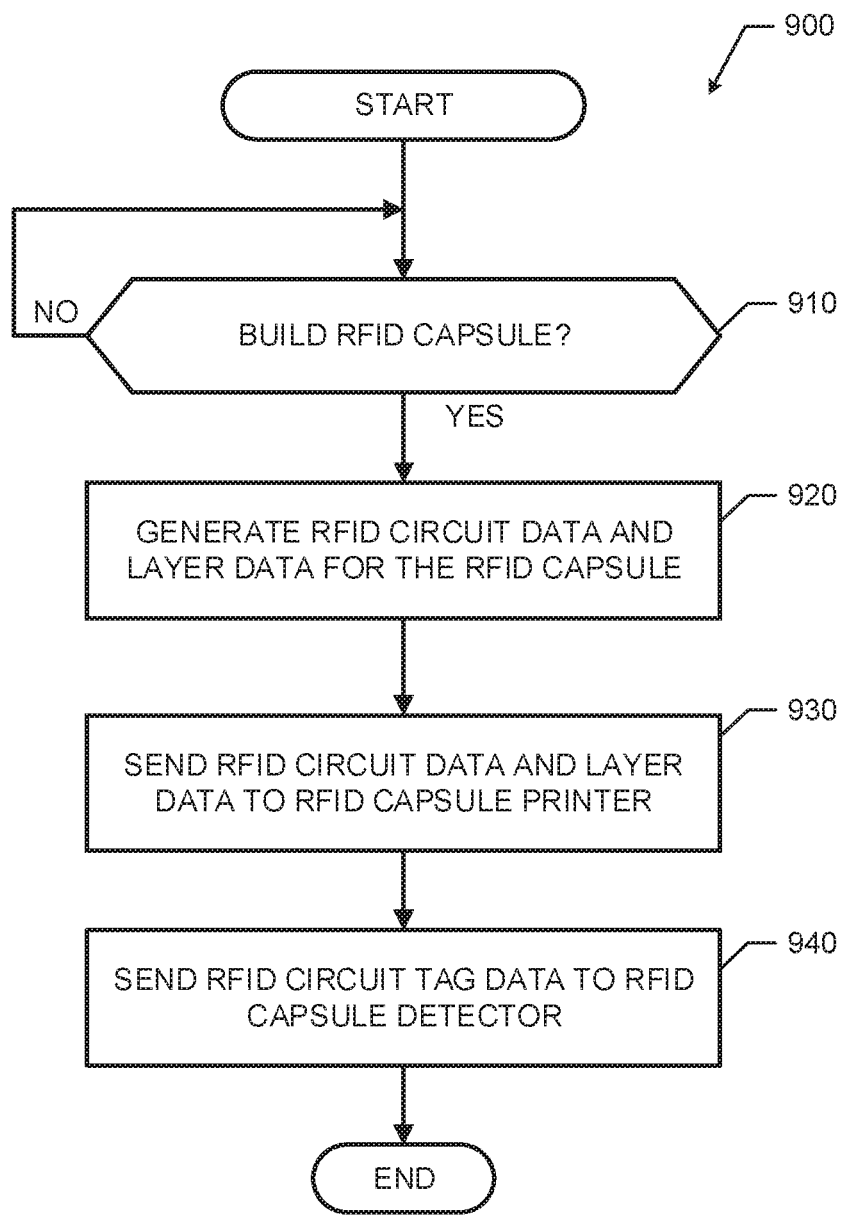
FIG. 9 is a flowchart representative of example machine readable instructions that may be executed to implement the RFID capsule builder of FIGS. 1 and/or 2.
Figure 10:
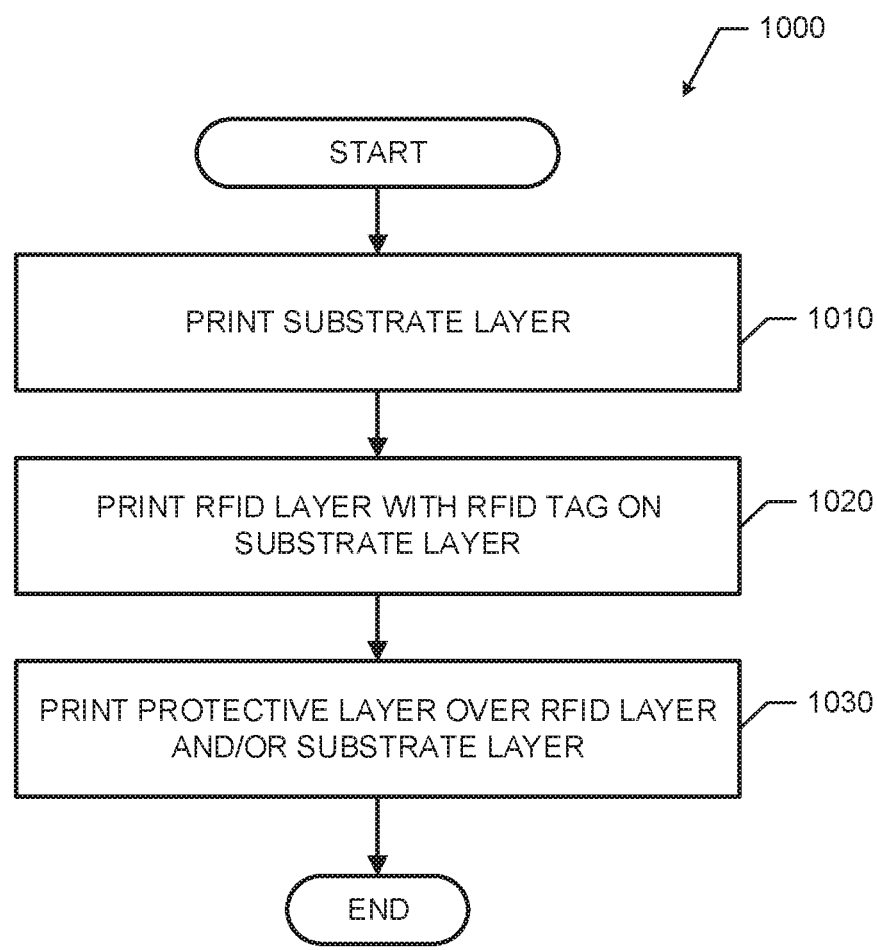
FIG. 10 is a flowchart representative of example machine readable instructions that may be executed to implement the RFID capsule printer of FIGS. 1 and/or 3.
Figure 11:
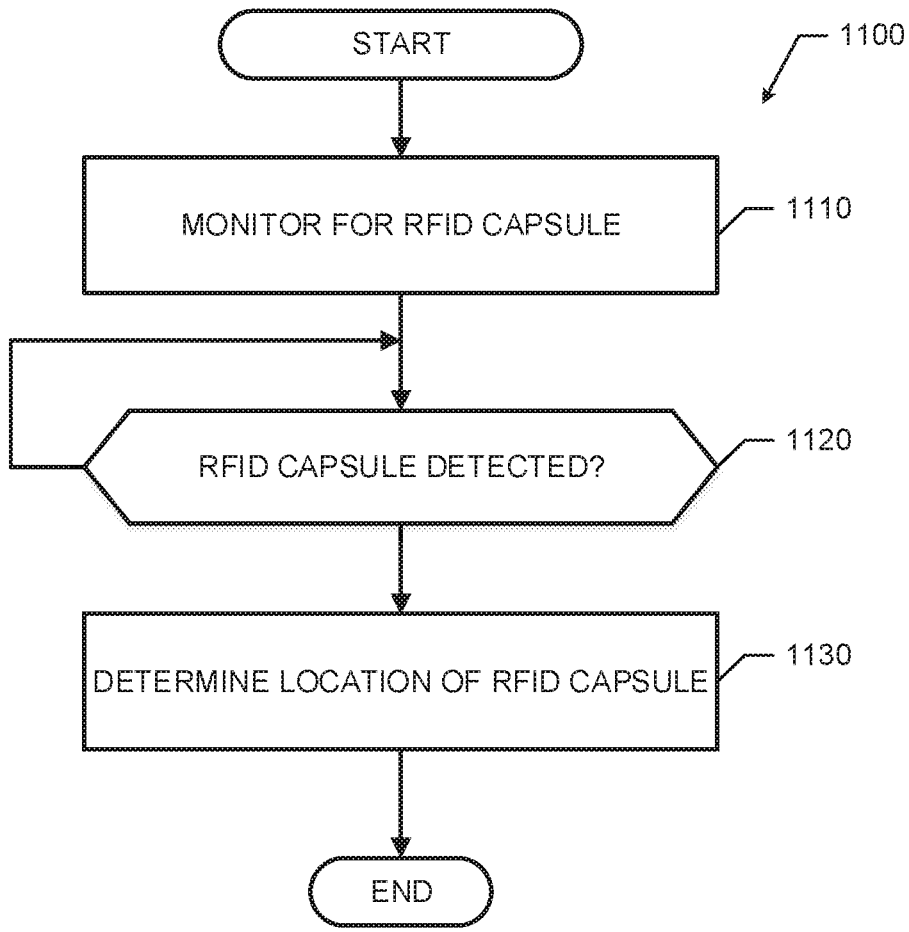
FIG. 11 is a flowchart representative of example machine readable instructions that may be executed to implement the RFID capsule detector of FIGS. 1, 6, and/or 7.

Flowcharts representative of example machine readable instructions for implementing the RFID capsule builder 110 of FIG. 2, the RFID capsule printer 120 of FIG. 3 and the RFID capsule detector 140 of FIG. 6 are shown in FIGS. 9, 10, and 11, respectively. In these example, the machine readable instructions may comprise a program/process for execution by a processor such as the processor 1212 shown in the example processor platform 1200 discussed below in connection with FIG. 12 and/or the RFID capsule printer 120. The program/process may be embodied in software stored on a tangible computer readable storage medium such as a CD-ROM, a floppy disk, a hard drive, a digital versatile disk (DVD), a Blu-ray disk, or a memory associated with the processor 1212, but the entire program/process and/or parts thereof could alternatively be executed by a device other than the processor 1212 and/or embodied in firmware or dedicated hardware. Further, although the example programs/processes are described with reference to the flowcharts illustrated in FIGS. 9, 10, and 11, many other methods of implementing the example RFID capsule builder 110, the example RFID capsule printer 120, and/or the RFID capsule detector 140, respectively, may alternatively be used. For example, the order of execution of the blocks may be changed, and/or some of the blocks described may be changed, eliminated, or combined.

FIG. 9 illustrates an example process 900 that begins with an initiation of the RFID capsule builder 110 of FIGS. 1 and/or 2 (e.g., due to startup of the RFID capsule builder 110, due to installation of the RFID system 100, etc.). At block 910, the RFID capsule builder 110 determines whether to build an RFID capsule 130. For example, at block 910, the RFID capsule builder 110 may monitor for instructions from a user via the builder interface 210. In some examples, the RFID capsule builder 110 may be automatically configured to build RFID capsules (e.g., in response to user instructions or other settings). If the RFID capsule builder 110 is not to build an RFID capsule 130 at block 910, the RFID capsule builder 110 continues to monitor whether to build an RFID capsule 130 (control returns to block 910). When the RFID capsule builder 110 determines that the RFID capsule 130 is to be built at block 910, the circuit designer 230 generates RFID circuit data and the layer designer 220 generates layer data for the RFID capsule 130 (block 920). For example, at block 920, the RFID circuit may be generated from instructions from a user and/or data files corresponding to an RFID circuit to implement an RFID tag of the RFID capsule 130.

At block 930 of FIG. 9, the RFID capsule builder 110 sends RFID circuit data and/or layer data to the RFID capsule printer 120. Accordingly, the RFID capsule printer 120 may then produce the RFID capsule 130 using the RFID circuit data and/or the layer data. At block 940 of FIG. 9, the RFID capsule builder 110 sends RFID circuit tag data to the RFID capsule detector 140. The example circuit tag data may indicate that a particular user corresponds to the RFID capsule 130. Accordingly, the RFID capsule detector 140 may display user information (e.g., name, title, identifier, rank, etc.) corresponding to an RFID capsule 130 received by the user to a user of the RFID capsule detector 140.

FIG. 10 illustrates an example process 1000 that begins with an initiation of the RFID capsule printer 120 of FIGS. 1 and/or 3 (e.g. upon receipt of print instructions form the RFID capsule builder 110, upon startup of the RFID capsule printer 120, etc.). At block 1010, the example RFID capsule printer 120 prints a substrate layer 410 of the RFID capsule 130. At block 1020, the RFID capsule printer 120 prints an RFID layer 420 on the substrate layer including an RFID tag. The example RFID tag may be formed from a plurality of different types of nanoparticle inks to make up corresponding components (e.g., resistors, capacitors, inductors, connectors, etc.) of a circuit of the RFID tag. At block 1030, the RFID capsule printer 120 prints a protective layer 430 over the RFID layer and/or the substrate layer. After block 430, the process 1000 of FIG. 10 ends. In some examples, after block 430, the RFID capsule printer 120 may print an outer layer 440 over the protective layer 430 that may dissolve after the RFID capsule 130 is received by a user and/or protect the RFID capsule 130 for surgical insertion.

FIG. 11 illustrates an example process 1100 that begins with an initiation of the RFID capsule detector 140 of FIGS. 1 and/or 6 (e.g. upon instructions from a user of the RFID capsule detector 140, upon startup of the RFID capsule detector 140, etc.). At block 1110, the RFID capsule detector 140 monitors for the RFID capsule 130 (and/or any other RFID capsules or RFID tags). For example, at block 1110, the RFID capsule detector 140 may directionally scan (e.g., my rotating a directional RFID receiver) to detect the RFID capsule 130. In another example, the RFID capsule detector 140, at block 1110, may continuously monitor all directions surrounding the RFID capsule detector 140 to detect the RFID capsule 130.

At block 1120, the capsule locator 620 determines whether the RFID capsule 130 (or any other RFID capsule or RFID tag) was detected. If no RFID tag of an RFID capsule 130 was detected, the capsule locator 620 continues to monitor for the RFID capsule 1110 (control returns to block 1120). If, at block 1120, the capsule locator 620 detects the RFID capsule 130 (or any other RFID capsule or RFID tag), the location analyzer 630, at block 1130, determines a location of the RFID capsule 130 (or the other detected RFID capsule or tag). After block 1130 in FIG. 11, the process 1100 ends. In some examples, after block 1130, the RFID capsule detector 140 presents the location of the RFID capsule 130 on a display. Additionally or alternatively, the RFID capsule detector 140 may process the location information and/or identification information from the RFID capsule 130 for display to a user in accordance with the teachings of this disclosure.

As mentioned above, the example processes of FIGS. 9, 10, and/or 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9, 10, and/or 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 12:
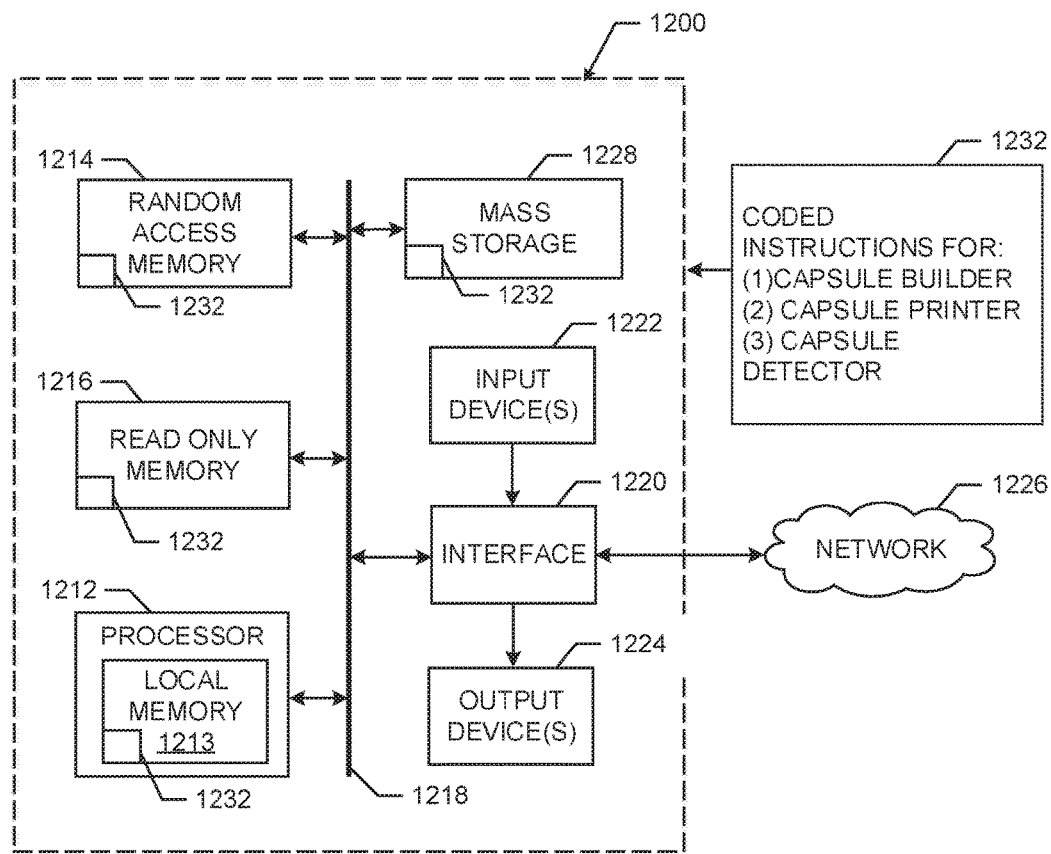
FIG. 12 is a block diagram of an example processor platform capable of executing the instructions of FIG. 9 to implement the RFID capsule builder of FIGS. 1 and/or 2, the instructions of FIG. 10 to implement the RFID capsule printer of FIG. 1, and/or the instructions of FIG. 11 to implement the RFID capsule detector of FIGS. 1 and/or 6.

FIG. 12 is a block diagram of an example processor platform 1200 capable of executing the instructions of FIGS. 9, 10, and 11 to implement the RFID capsule builder 110 of FIG. 2, the RFID capsule printer 120 of FIG. 3, and/or the RFID capsule detector 140 of FIG. 6. The processor platform 1200 may be or may be included in any type of apparatus, such as a server, a personal computer, a mobile device (e.g., a cell phone, a smart phone, a tablet such as an iPad™), a personal digital assistant (PDA), an Internet appliance, or any other type of computing device or apparatus.

The processor platform 1200 of the illustrated example of FIG. 12 includes a processor 1212. The processor 1212 of the illustrated example is hardware. For example, the processor 1212 can be implemented by at least one integrated circuit, logic circuit, microprocessor or controller from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, at least one input device 1222 is connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 1224 is also connected to the interface circuit 1220 of the illustrated example. The output device(s) 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes at least one mass storage device 1228 for storing software and/or data. Examples of such mass storage device(s) 1228 include floppy disk drives, hard drive disks, compact disk drives, Blu-ray disk drives, RAID systems, and digital versatile disk (DVD) drives.

The coded instructions 1232 of FIGS. 9, 10, and/or 11 may be stored in the mass storage device 1228, in the local memory 1213 in the volatile memory 1214, in the non-volatile memory 1216, and/or on a removable tangible computer readable storage medium such as a CD or DVD.

From the foregoing, it will be appreciated that the above disclosed methods, apparatus and articles of manufacture provide an RFID capsule for identification of user that received the RFID capsule. Examples disclosed herein involve producing the RFID capsule from layers created by a three-dimensional printer such that the RFID capsule may be received by a user. Furthermore, examples disclosed herein allow for identification of the user and/or RFID capsule and presentation of a location of the user and/or the RFID capsule so that another user may know the location of the user that received the RFID capsule. Furthermore, examples herein involve presenting information corresponding to thea user based on detecting the RFID capsule.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A capsule comprising:
   a substrate layer;
   a radio frequency identification layer on the substrate layer, the radio frequency identification layer comprising a radio frequency identification tag formed from nanoparticle ink, wherein the radio frequency identification tag comprises:
      silver nanoparticle connectors applied by a print head of a three-dimensional printer, and
      at least one inductor formed from a strontium ferrite nanoparticle ink; and
   a protective layer surrounding the radio frequency identification layer, wherein at least one of the substrate layer and the protective layer comprises a polycarbonate ink applied by a print head of the three-dimensional printer.

2. The capsule of claim 1, further comprising:
   a dissolvable layer surrounding the protective layer, the dissolvable layer to dissolve after being ingested by a user.

3. The capsule of claim 1, wherein the nanoparticle ink comprises a plurality of ink patterns to form corresponding components of the radio frequency identification tag.

4. The capsule of claim 3, wherein the plurality of ink patterns form at least one of a resistor, an inductor, a capacitor, or an antenna.

5. The capsule of claim 1, wherein the radio frequency identification tag comprises a resistor, the resistor comprising at least a portion of the nanoparticle ink.

6. The capsule of claim 1, wherein the radio frequency identification tag comprises a capacitor, nanoparticle ink comprising a gold nanocrystal to form electrodes of the capacitor and an ion gel ink to form a dielectric of the capacitor.

7. A method to form a capsule, the method comprising:
   printing a substrate layer of the capsule;
   printing a radio frequency identification tag from nanoparticle ink in a radio frequency identification layer of the capsule, the radio frequency identification layer printed on the substrate layer, wherein the radio frequency identification tag comprises at least one inductor formed from a strontium ferrite nanoparticle ink; and printing a protective layer of the capsule over the radio frequency identification layer and the substrate layer, wherein at least one of the substrate layer and the protective layer comprises a polycarbonate ink applied by a print head of a three-dimensional printer.

8. The method of claim 7, further comprising:
printing a dissolvable layer over the protective layer, the dissolvable layer configured to dissolve after the capsule is ingested by a user.

9. The method of claim 7, further comprising:
receiving characteristics of the radio frequency identification tag, wherein printing the radio frequency identification tag comprises printing components of the radio frequency identification tag from patterns of the nanoparticle ink.

10. The method of claim 9, wherein the patterns of the nanoparticle ink include at least one of a silver nanoparticle ink, a strontium ferrite ink, a gold nanocrystal ink, an ion gel ink, and a nanocarbon ink.

11. A method for detecting a radio frequency identification capsule comprising:
monitoring for a radio frequency identification tag of the radio frequency identification capsule, the radio frequency identification tag formed from nanoparticle ink, wherein the radio frequency identification tag comprises at least one inductor formed from a strontium ferrite nanoparticle ink;
detecting the radio frequency identification tag;
determining a location of a user that received the radio frequency identification capsule; and
determining health data for the user from a health monitoring system based at least in part on information describing the radio frequency identification tag.

12. The method of claim 11, further comprising presenting the location of the user on a display.

13. The method of claim 12, further comprising: presenting an image of the user on the display; and
presenting information corresponding to the location on the display.

14. The method of claim 13, wherein the image is a real-time image of the user and the information is displayed in response to the real-time image of the user appearing on the presentation device.

15. The method of claim 11, further comprising:
receiving characteristics of the user; and
presenting the location and the characteristics of the user in response to detecting the radio frequency identification on a display.

16. The method of claim 11, wherein the user received the radio frequency identification capsule by ingesting the radio frequency identification capsule.

* * * * *